W. T. GIBBS.
PROCESS OF MAKING CHROMATES.
APPLICATION FILED SEPT. 20, 1907.
901,436.
Patented Oct. 20, 1908.
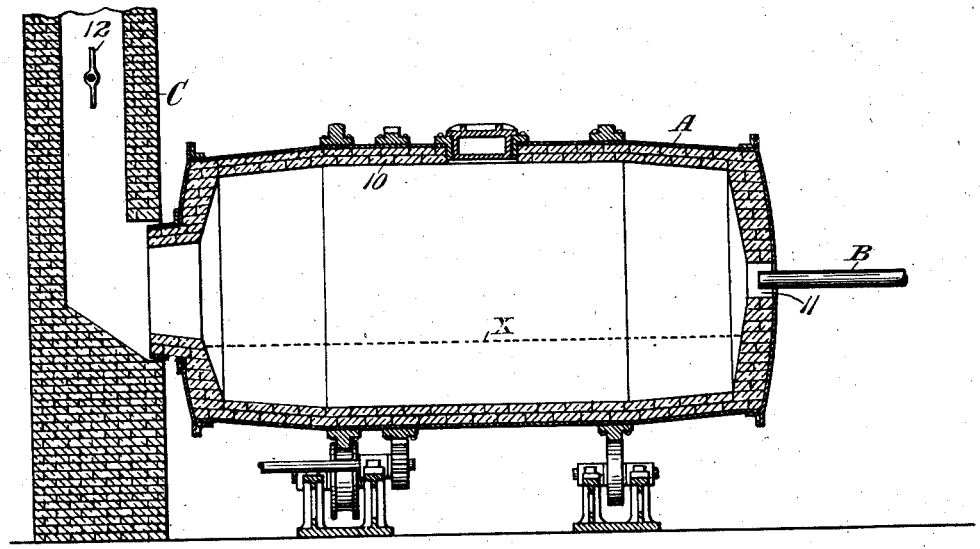

UNITED STATES PATENT OFFICE.

WILLIAM T. GIBBS, OF BUCKINGHAM, QUEBEC, CANADA, ASSIGNOR TO THE NATIONAL ELECTROLYTIC COMPANY, A CORPORATION OF NEW YORK.

PROCESS OF MAKING CHROMATES.

No. 901,436.        Specification of Letters Patent.        Patented Oct. 20, 1908.

Application filed September 20, 1907. Serial No. 393,819.

*To all whom it may concern:*

Be it known that I, WILLIAM TAYLOR GIBBS, a subject of the King of Great Britain and Canada, residing at Buckingham, Province of Quebec, county of Ottawa, Canada, have invented certain new and useful Improvements in Processes of Making Chromate of Soda and other Chromates, fully described and represented in the following specification.

This invention relates especially to a new method of making chromate of soda from chrome iron ore, but the method is applicable also to other chromates.

The manufacture of chromate of soda is at present usually carried out by roasting a mixture of finely ground chrome iron ore, lime, and carbonate of soda at a high temperature on the hearth of a reverberatory furnace. The labor cost of this process is very high and a considerable amount of chrome ore is unacted upon and lost. Attempts have been made to carry out this process in mechanically operated furnaces, but the results secured have been unsatisfactory, owing to the material forming into solid lumps or masses, the surfaces of which are roasted while the interiors remain unchanged.

I have discovered that by using a mixture of finely ground chrome iron ore and sufficient carbonate of soda to give a fluid melt and carrying out the process in a rotary furnace, so that the heavy ore is constantly carried up into the hot air within the furnace and falls through the heated oxidizing atmosphere into the bath of molten alkali in the bottom of the furnace, the material does not form into solid lumps or masses and the ore is completely decomposed and the lime used in the hearth process may be entirely omitted. The process results also in the production and possible recovery of aluminate of soda, so that a process of simultaneously producing aluminates and chromates is provided. The process is applicable also with other chromates as, for instance, with carbonate of potassium to produce chromate of potassium.

In carrying out my process in the preferred manner to produce chromate of soda, I mix the finely ground chrome iron ore with sufficient carbonate of soda to produce a fluid mass, and charge the mixture into a rotating furnace kept at a proper temperature. The amount of carbonate of soda and the furnace temperature may be varied somewhat so long as they are sufficient to keep the mass fluid, and will vary under different conditions, but I have secured satisfactory results with the carbonate of soda about one and two thirds times the weight of the chrome iron ore, and with furnace temperatures of about 1200° centigrade.

The reaction commences at once and, by the rotating of the furnace, the fluid mass is constantly agitated and mixed, and the ore, which sinks to the bottom of the bath of molten alkali, is continuously carried up and dropped through the heated oxidizing atmosphere within the furnace into the bath, so as to be continuously exposed to heat and oxygen and the solvent action of the bath of fused alkali. Even when under the bath, moreover, the ore is at a high temperature, as every part of the rotary furnace wall is exposed to the full heat, and that portion of the furnace which is temporarily under the bath is approximately as hot as other portions and is not protected from the heat as it would be in an ordinary reverberatory furnace. The ore is completely decomposed in a few hours, the whole of the chromium oxid of the ore being converted into chromic trioxid. The fluid mass is then run out of the furnace, allowed to cool, crushed to about one quarter inch pieces and agitated with water. The chromate of soda is quickly dissolved together with the excess of carbonate of soda and some aluminate of soda which is formed by the action of the soda on the alumina of the ore. The solution is filtered from the insoluble residue, and the alumina and carbonate of soda then removed by any well-known or suitable method and the remaining chromate of soda solution then treated in any desired manner.

The process is very efficient and economical, and as compared with the lime process secures the important advantages, in addition to the great saving of labor, that it avoids the loss of chrome ore incident to the lime process, and the residues insoluble in water and the alumina recovered from the solution both have commercial values, whereas the residue from the lime process is waste material.

In the accompanying drawing there is shown diagrammatically a rotary furnace suitable for carrying out the present invention.

In the drawing A is the rotary furnace, having a lining 10, of suitable material unacted upon by the charge, such for instance as magnesite brick, the ordinary level of the charge being indicated by the line X. This furnace is shown as fired by gas introduced through gas pipe B, the air supply through opening 11 around the gas pipe being in excess of that required for the complete combustion of the gas, so as to maintain the oxidizing atmosphere desired in the furnace, and the other end of the furnace being connected with a stack C controlled by a damper 12, to provide a draft which may be regulated as desired. It will be understood, however, that the construction of the furnace, and means for firing it and securing the oxidizing atmosphere, may be varied.

What I claim is:—

1. In a process of making chromates, roasting finely ground chrome iron ore mixed with sufficient alkaline carbonate and at a sufficient temperature to keep the mass fluid and continuously raising the ore from the fluid mass and returning it to the bath to subject it to the oxidizing atmosphere above the bath.

2. In a process of making chromate of soda, roasting finely ground chrome iron ore mixed with sufficient carbonate of soda and at a sufficient temperature to keep the mass fluid, and rotating vertically the furnace chamber containing the ore during the roasting process.

3. The process of simultaneously producing aluminates and chromates, which consists in roasting finely ground chrome iron ore, mixed with sufficient alkaline carbonate and at a sufficient temperature to keep the mass fluid and rotating vertically the furnace chamber containing the ore during the roasting process, and dissolving out the aluminate and chromate.

4. The process of simultaneously producing aluminate and chromate of soda, which consists in roasting finely ground chrome iron ore mixed with sufficient carbonate of soda and at a sufficient temperature to keep the mass fluid and rotating vertically the furnace chamber containing the ore during the roasting process, and dissolving out the aluminate and chromate of soda.

5. In a process for making chromates, roasting finely ground chrome iron ore mixed with sufficient alkaline carbonate and at a sufficient temperature to keep the mass fluid, and agitating said fused mixture while exposing the same to the action of air.

6. In a process of making chromate of soda, roasting finely ground chrome iron ore mixed with sufficient carbonate of soda at a sufficient temperature to keep the mass fluid, and agitating said fused mixture while exposing the same to the action of air.

7. The process of simultaneously producing aluminates and chromates, which consists in roasting finely ground chrome iron ore, mixed with sufficient alkaline carbonate and at a sufficient temperature to keep the mass fluid and agitating said fused mixture while exposing the same to the action of air, and dissolving out the aluminate and chromate.

8. The process of simultaneously producing aluminate and chromate of soda, which consists in roasting finely ground chrome iron ore mixed with sufficient carbonate of soda and at a sufficient temperature to keep the mass fluid and agitating said fused mixture while exposing the same to the action of air, and dissolving out the aluminate and chromate of soda.

In testimony whereof, I have hereunto set my hand, in the presence of two subscribing witnesses.

WILLIAM T. GIBBS.

Witnesses:
 HORACE M. SANFORD,
 WALTER A. WILLIAMS.